(12) United States Patent
Bringby et al.

(10) Patent No.: US 6,175,745 B1
(45) Date of Patent: Jan. 16, 2001

(54) INITIAL TRANSMIT POWER DETERMINATION IN A RADIOCOMMUNICATION SYSTEM

(75) Inventors: Daniel Bringby, Huddinge; Tomas Lundborg, Stockholm, both of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/998,067

(22) Filed: Dec. 24, 1997

(51) Int. Cl.$^7$ ........................... H04Q 7/20
(52) U.S. Cl. ............... 455/522; 455/69; 455/88
(58) Field of Search .................... 455/522, 438, 455/436, 422, 69; 370/342; 375/200

(56) References Cited

U.S. PATENT DOCUMENTS

| | | | |
|---|---|---|---|
| 4,696,027 | 9/1987 | Bonta | 379/60 |
| 4,718,081 | * 1/1988 | Brenig | 455/438 |
| 4,811,421 | * 3/1989 | Havel et al. | 455/69 |
| 5,056,109 | * 10/1991 | Gilhousen et al. | 370/342 |
| 5,107,487 | 4/1992 | Vilmur et al. | 370/18 |
| 5,216,692 | * 6/1993 | Ling | 375/200 |
| 5,287,544 | * 2/1994 | Menich et al. | 455/422 |
| 5,487,180 | * 1/1996 | Ohtake | 455/54.1 |
| 5,574,747 | * 11/1996 | Lomp | 375/200 |
| 5,574,984 | * 11/1996 | Reed et al. | 455/69 |
| 5,590,156 | 12/1996 | Carney | 375/316 |
| 5,697,053 | * 12/1997 | Hanly | 375/200 |
| 5,768,684 | * 6/1998 | Grubb et al. | 455/13.4 |
| 5,771,451 | * 6/1998 | Takai et al. | 455/442 |
| 5,812,938 | * 9/1998 | Gilhousen et al. | 455/69 |
| 5,839,056 | * 11/1998 | Hakkinen | 455/69 |
| 5,845,208 | * 12/1998 | Hottinen et al. | 455/422 |
| 5,884,187 | * 3/1999 | Ziv et al. | 455/522 |
| 5,887,245 | * 3/1999 | Lindroth et al. | 455/69 |

FOREIGN PATENT DOCUMENTS

| | | | |
|---|---|---|---|
| WO94/06218 | 3/1994 | (WO) | H04B/7/005 |
| WO95/24810 | 9/1995 | (WO) | H04Q/7/38 |
| WO96/09696 | 3/1996 | (WO) | H04B/7/005 |

OTHER PUBLICATIONS

European Standard Search Report re RS 100517 Date of completion of search: Aug. 27, 1998.

* cited by examiner

*Primary Examiner*—Fan Tsang
*Assistant Examiner*—Blane J. Jackson
(74) *Attorney, Agent, or Firm*—Burns, Doane, Swecker & Mathis, L.L.P.

(57) ABSTRACT

A radiocommunication method and system employs base station transmit power level setting based upon uplink and downlink pathloss. Measurements made by both the mobile station and the base station are used to improve the pathloss estimate, which in turn provides for a more appropriate power level setting for the base station.

16 Claims, 5 Drawing Sheets

INITIAL TRANSMIT POWER DETERMINATION IN A RADIOCOMMUNICATION SYSTEM

BACKGROUND

The present invention is directed generally to radio communication systems and, more particularly, to techniques and structures for determining an appropriate power level for a base station to begin transmitting information to a mobile station on a traffic channel.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different timeslots on the same frequencies. However, neither methodologies completely eliminate interference. For example, TDMA methods allow for several users on the same frequency while avoiding interference caused by transmissions on adjacent timeslots of the same frequency through the use of synchronization circuitry which gates the reception of information to prescribed time intervals. Co-channel interference (i.e, interference arising from the re-use of the same frequency in different cells) is minimized to tolerable levels by only reusing frequencies in cells which are spaced a predetermined distance apart (the "reuse" distance).

In contrast, Code Division Multiple Access (CDMA) systems explicitly allow interfering signals to share the same frequency at the same time. More specifically, CDMA systems "spread" signals across a common communication channel by multiplying each signal with a unique spreading code sequence. The signals are then scrambled and transmitted on the common channel in overlapping fashion as a composite signal. Each mobile receiver correlates the composite signal with a respective unique despreading code sequence, and thereby extracts the signal addressed to it.

Regardless of the access methodology employed, at least some signals which are not addressed to a particular mobile station assume the role of interference. In CDMA systems, all signals interfere with one another due to the complete sharing of bandwidth, while in TDMA and FDMA systems, co-channel and adjacent channel interference arises from some signalling. To achieve reliable reception of a signal, the ratio of the received, desired signal to the interference should be above a prescribed threshold for each mobile station (referred to as a "required signal-to-interference" level, or $SIR_{req}$). For example, as shown in FIG. 1, consider the case where three mobile stations receive, respectively, three signals from a common CDMA communication band. Each of the signals has a corresponding energy associated therewith—namely energy levels E1, E2 and E3, respectively. Also, present on the communication band is a certain level of noise (N). For the first mobile station to properly receive its intended signal, the ratio between E1 and the aggregate levels of E2, E3 and N must be above the first mobile's required signal-to-interference ratio.

Those skilled in the art will appreciate that similar situations exist for mobile stations in FDMA and TDMA systems when considering the effect of mobiles receiving signals on co-channels or adjacent channels. This situation can be conceptualized as illustrated in FIG. 2. Therein, base station BS1 is transmitting to mobile station 200 over a traffic channel using a particular frequency. At the same time base station BS2 is transmitting to mobile station 220 on the same frequency. Thus, any signal rays received by mobile station 220 from base station BS1 constitute interference which reduces mobile station 220's signal to interference ratio with respect to its desired signal from base station BS2.

To improve the signal-to-interference ratio for a given mobile station, the energy level of the signal transmitted to that mobile station is increased to appropriate levels. However, increasing the energy associated with one mobile station increases the interference associated with other mobile stations, e.g., those assigned to co-channels or adjacent channels. As such, radiocommunication systems must strike a balance between the desire to provide good reception at each mobile station individually and the desire to limit interference globally within the system. These competing desires led to the implementation of power control techniques in radiocommunication systems.

Power control can be considered at two stages of a connection between a mobile station and a base station: (1) setting initial transmit power(s) at which the mobile station and base station will begin transmissions on the traffic channel and (2) adjusting the initial transmit power(s) to arrive at optimum transmit power(s) given the manner in which the system operator decides to weight the criteria described above. The latter category has given rise to, for example, so-called open loop and closed loop power control techniques, which will be well known to those skilled in the art, but are not particularly relevant to this specification and, therefore, are not further described herein.

Conventionally, setting the initial transmit power level for transmissions by a base station on the downlink to a particular mobile station has been accomplished using one of two techniques. First, some systems simply use a fixed, predetermined initial transmit power which is used to begin information transmission on all traffic channels. However, these systems generally create excessive interference, since the fixed, predetermined initial transmit power is set to a relatively high level.

Accordingly, other systems employ a second technique which obtains measurements from the mobile station of transmissions made by the base station on a control channel (i.e., an overhead signalling channel) and uses these measurements to determine an appropriate initial transmit power for sending information to that mobile station on a traffic channel. An example of this latter technique for determining an initial transmit power is described in U.S. Pat. No. 5,487,180 to Ohtake.

Like the technique employing fixed, initial transmission power, there are also several problems associated with this second conventional technique. For example, if the base station (or system) uses the measurements made by the mobile station of its received signal strength to estimate a downlink pathloss associated with its transmissions as part of its initial transmit power calculation, this downlink pathloss estimate will contain errors that result in a less than optimal initial power setting. The base station may subtract the signal strength at which the mobile unit received its transmissions from the power at which it made those transmissions to arrive at an estimate for the downlink pathloss. However, both the received signal strength and the base station's own power may be measured relatively imprecisely, causing the downlink pathloss estimate to be erroneous and resulting in an improper initial transmit power setting. Moreover, the received signal strength measured by either or both of the mobile and base stations may include some component attributable to interference and/or noise.

Additionally, some older systems (e.g., AMPS) do not even provide a capability for relaying mobile station measurements to the system, making downlink pathloss estimation impossible.

It is therefore an exemplary objective of the present invention to provide a technique and a system for more accurately estimating an initial transmit power to be used in transmitting to a mobile station.

SUMMARY

These and other drawbacks and limitations of conventional techniques and systems are overcome by exemplary embodiments of the present invention wherein pathloss estimates of both the uplink and the downlink are used to obtain a more accurate picture of the environment between the base station and the mobile station from which to determine an optimal, initial transmit power for the base station. A weighted combination of the uplink and downlink pathlosses can be used in determining the initial base station transmit power.

For systems wherein measurements made by a mobile station cannot be reported to the system, other exemplary embodiments of the present invention provide for initial base station power transmission to be determined based upon the uplink pathloss alone.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
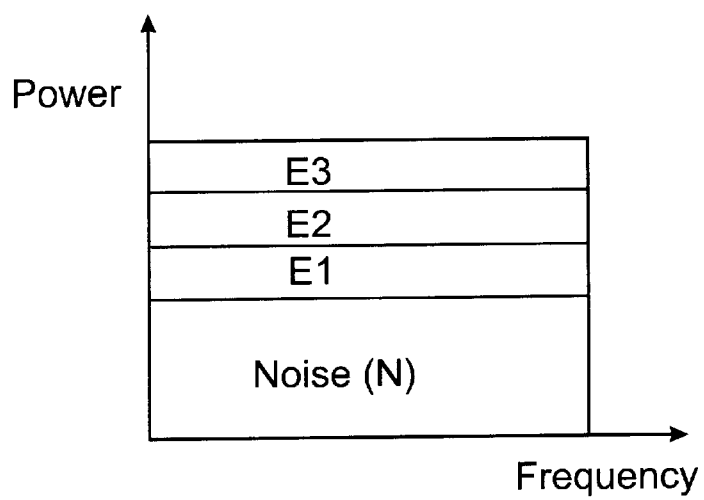
FIG. 1 shows an exemplary distribution of signal energies within a common band.
Figure 2:
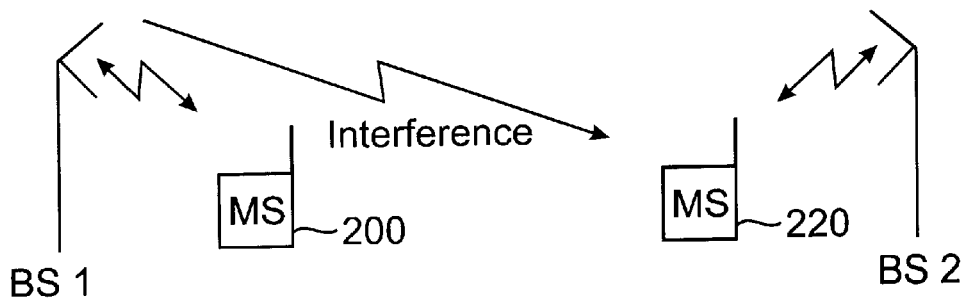
FIG. 2 illustrates the concept of co-channel interference.
Figure 3:
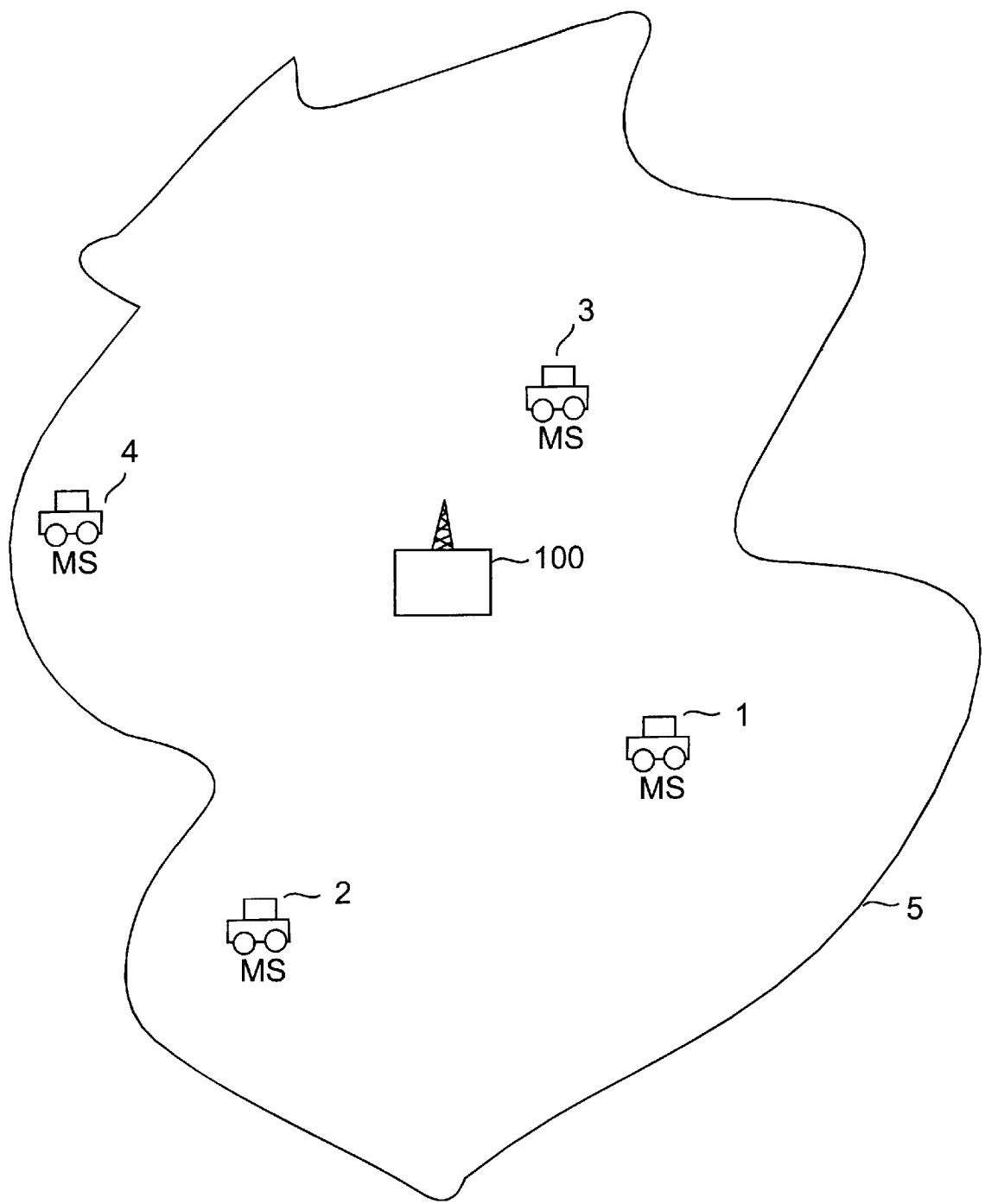
FIG. 3 is a diagram of a cell having a base station and several mobile stations.

Consider the exemplary situation depicted in FIG. 3. Therein, a base station 100 is currently handling connections with three mobile stations (MS) 1–3 (MS 4 being idle). For the purposes of this exemplary embodiment, consider that the system depicted in FIG. 3 operates using a CDMA technology with duplexed downlink (i.e. base-to-mobile direction) and uplink (i.e. mobile-to-base direction) channels, although those skilled in the art will appreciate that the present invention is applicable to any access methodology. In the downlink, base station 100 transmits to each of mobile stations 1, 2 and 3 using a certain power level associated with each of these mobile stations. These mobile stations will also receive signals transmitted from base stations in other cells (not shown), which signals can be used to perform handoff related or channel allocation measurements. In the uplink, mobile stations 1, 2, and 3 communicate with base station, each using a certain power level. Although not shown, the base station 100 is in communication with a radio network controller (RNC), which in turn is connected to a public switched telephone network (PSTN).

Control of the mobile station's power level can be performed using known power control techniques. For example, the base station 100 can measure an uplink signal quality parameter, e.g., signal strength, associated with a particular mobile station. The base station then calculates a desired power level for the mobile station and compares the desired power level with the mobile station's current power level. If a change is needed, then the base station 100 orders the mobile station to change its output power. The mobile station acknowledge's the new power level so that the base station 100 knows the mobile station's current power level.

Figure 4:
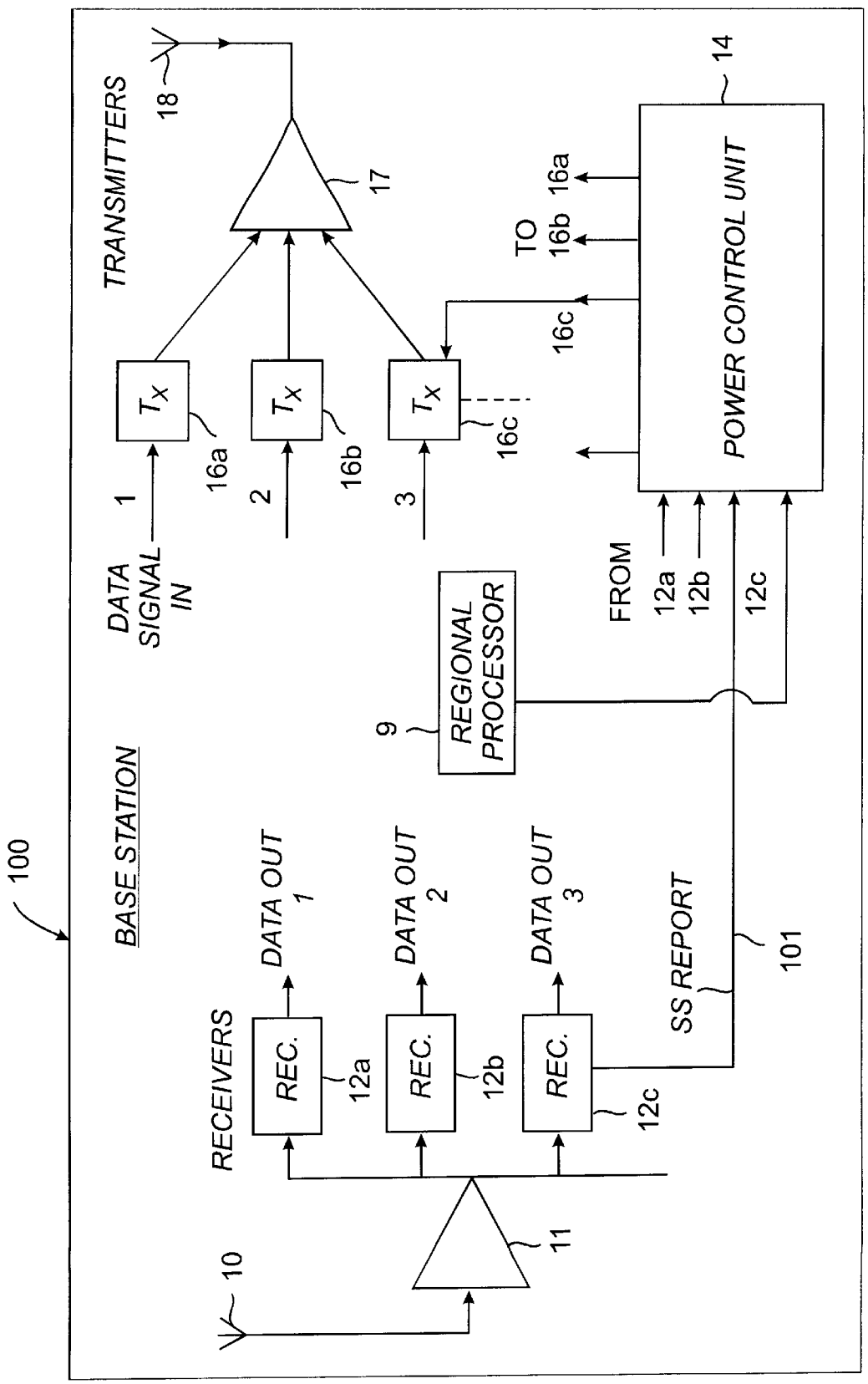
FIG. 4 is a block diagram of a base station according to an exemplary embodiment of the present invention.

As illustrated in FIG. 4, the base station 100 is equipped with a plurality of transmitters 16 (only three transmitters 16a, 16b, 16c are illustrated to simplify the figure) for transmitting different data signals to a plurality of mobile stations via a transmitter amplifier 17 and an antenna 18. The relative power level of each transmitted signal is determined by a power control unit 14. As will be described in more detail below, the power control unit 14 according to the present invention determines an initial power at which to transmit to a mobile station based on an uplink pathloss estimate and, if available, on a downlink pathloss estimate associated with a connection to the mobile station. This determination is made based, in part, on information reported by the mobile station to the base station, which information is received on antenna 10, amplified by amplifier 11, and processed by one of the receivers 12a–12c. The power control unit obtains received signal strength measurements from the one of the receivers 12a–12c relating to transmissions from a mobile station, as well as information relating to the transmit power used by the mobile station and the signal strength measured and reported by the mobile station via, for example, input 101 if receiver 12c is being used. A regional processor 9 controls the overall operation of the base station 100.

Figure 5:
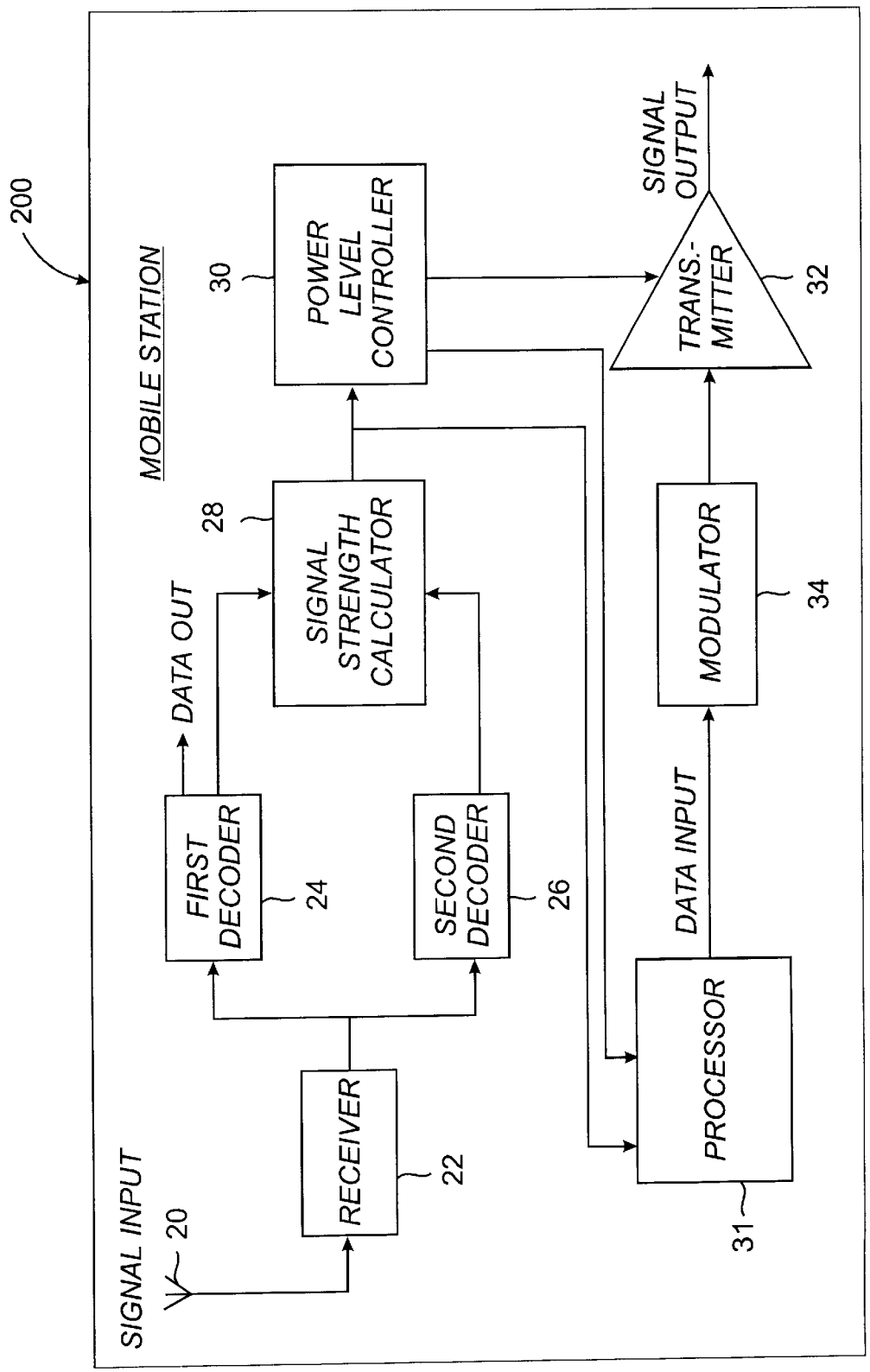
FIG. 5 is a block diagram of a mobile station according to an exemplary embodiment of the present invention.

According to FIG. 5, an exemplary mobile station 200 (e.g., any one of MS1–4) is equipped with a receiver 22 which operates in a conventional manner to filter, amplify and demodulate a signal from antenna 20. A first decoder 24 is provided for selectively receiving and decoding its intended signal transmitted from the base station 100 and measuring its signal strength. Data signals demodulated in the first decoder are generated as output data signals for subsequent use. Other signals transmitted from the base station 100 intended for other mobiles within its cell are received and decoded in a second decoder 26 where their respective signal strengths are measured. A signal strength calculator 28 receives the signal strength measurements from both of the first and second decoders 24 and 26 and calculates a transmission power for the mobile 200 to use in transmissions to the base station 100. Processor 31 receives information regarding the signal strength measured by the mobile station in the downlink and the transmit power which it is using to transmit signals to the base station in the uplink. This signal strength and transmit power information, as well as other data input signals to be transmitted from the mobile 200 to the base station 100 and used in determining the initial base station power transmission as described below, are received in a modulator 34. A transmitter 32 receives the modulated signal. Based on the received signal strength power calculated by the signal strength calculator 28, a power level controller 30 varies the power of the transmitter 32 to transmit a mobile output signal.

Any known power control loop technique may be employed to coordinate the activities of the downlink power control and the uplink power control after a connection is established. For instance, the system may use the control loop technique identified in U.S. Pat. No. 5,345,598 to Paul W. Dent, which is incorporated by reference herein. or the dynamic power control discussed hereinabove in the background section of the present application. However, the initial power level at which the base station 100 will transmit to any particular mobile station is determined in accordance with the present invention as will now be described.

To determine an appropriate initial power level for transmitting to a particular mobile station preferably both an uplink pathloss $L_{UP}$ and a downlink pathloss $L_{DN}$ are estimated using measurements performed by both the mobile station and the base station. The downlink pathloss $L_{DN}$ is estimated as the difference between the transmission power at the base station $P_{BS}$ and the received signal strength at the mobile station $SS_{MS}$. Note that herein, pathlosses L are quantified in dB, powers P are quantified in dBm and signal strengths SS are also quantified in dBm. Similarly, the uplink pathloss $L_{UP}$ is estimated as the difference between the transmission power at the mobile station $P_{MS}$ and the received signal strength at the base station $SS_{BS}$. However, if different reference points are used to measure transmission power and received signal strength at the base station, pathloss is not reciprocal and a compensation value needs to be added, i.e., to compensate for the pathloss difference between the reference points. As an illustrative example, a compensation value for a typical model RBS884 base station (manufactured by Telefonaktiebolaget L M Ericsson (publ)) operating in the 850 MHz band without a tower mounted amplifier is +5.2 dB. Thus, the pathloss estimates can be made using the following equations:

$$L_{DN}=P_{BS}-SS_{MS}$$

$$L_{UP}=P_{MS}-SS_{BS}+dL,$$

where dL is the aforedescribed compensation value.

Figure 6:
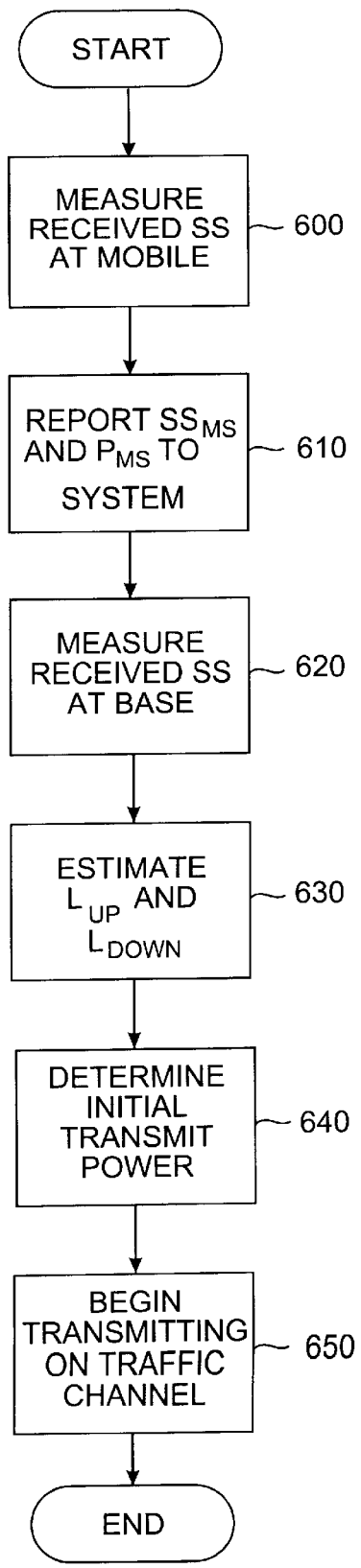
FIG. 6 is a flowchart illustrating an exemplary technique for determining an initial transmit power for a base station according to an exemplary embodiment of the present invention.

These pathloss estimates can then be weighted to achieve a more accurate pathloss estimate. For example, the composite pathloss estimate L can be determined as:

$$L=a*L_{up}+b*L_{DN}$$

where a and b are weighting values and a+b=1.
The weighting values a and b can be determined by, for example, empirical evaluation of both the signal strength measurements made by the mobile station and the base station, as well as the identification of transmit powers made by both the mobile and base stations. If, for example, the base station's measurement of received signal strength was twice as accurate as that performed by the mobile station, and the transmit power identifications by both stations were approximately equally accurate, then one could select a=0.33 and b=0.66 to arrive at a composite pathloss L which is expected to be relatively more accurate for any given pathloss estimate. Alternatively, the weighting can be accomplished by taking the greater of the two pathlosses as L. Once a composite pathloss is determined, then the initial base station transmit power is determined by adding the minimum required signal strength received by a mobile station to the composite pathloss. This exemplary embodiment of the present invention is illustrated in the flowchart of FIG. 6.

Therein, at step 600, the mobile station measures a received signal strength associated with a base station transmission. Then, at step 610, it reports the measured signal strength and the power at which it is transmitting to the base station. Next, the base station measures the strength at which it is receiving transmissions from the mobile station, at step 620. Then, having all of the information necessary, the system estimates the uplink and downlink pathlosses at step 630. From the pathlosses, an appropriate initial transmit power is determined (step 640) and tranmissions to the mobile station on a traffic channel commence (step 650).

As mentioned earlier, some systems (e.g., AMPS), do not provide for the mobile station to make signal strength measurements and report those measurements to the system. For these types of systems, it is not possible to estimate the downlink pathloss. Thus, according to another exemplary embodiment of the present invention, the initial transmit power for the base station is determined based solely upon the uplink pathloss, i.e., a=1 and b=0. As will be appreciated by those skilled in the art, this is exactly the opposite of conventional techniques which rely solely on measurements made by the mobile station to determine an initial base station transmit power.

The determination of initial base station power according to the present invention can be applied in various contexts within the operation of a radiocommunication system. Idle mobile stations may, for example, be used as measurement probes in a process commonly referred to as mobile assisted channel allocation (MACA). MACA techniques are used to instruct idle mobile stations to measure a list of traffic channels and inform the system of their measurements. These measurements are then used to assist the system in determining which traffic channels are most appropriate for allocation to a particular mobile station at call-setup. However, these measurements can also be used in the aforedescribed exemplary embodiments to supply the value of $SS_{MS}$.

For example, the aforedescribed techniques for determining initial base station transmit power can be applied at call-setup when a traffic channel is to be allocated to a mobile station using the MACA report information to supply $SS_{MS}$ in the foregoing equation for downlink pathloss. Additionally, $P_{BS}$ will be the transmit power of the base station on the control channel, $P_{MS}$ will be the mobile station transmission power used to signal the system that an access is being made on the control channel, and $SS_{BS}$ will be the strength at which the base station receives those access signals on the control channel.

Similarly, these techniques can be applied at handoff to determine an initial transmit power level for the new base station, i.e., the base station to which the connection is being handed off. Under these conditions, the system can use measurements made by the mobile station being handed off (commonly referred to as mobile-assisted handoff (MAHO) measurements) to supply a value for $SS_{MS}$. Additionally, $P_{BS}$ will be the transmit power of the base station on the control channel, $P_{MS}$ will be the mobile station transmission power on the traffic channel prior to handoff and $SS_{BS}$ will be the signal strength received at the target base station during verification of the mobile station on the traffic channel.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being commensurate in scope with the following claims including equivalents thereof.

What we claim is:

1. A method for determining an initial transmit power for a base station transceiver in a radiocommunication system comprising the steps of:

measuring a first received signal strength at a mobile station;

measuring a second received signal strength at a base station;

estimating a downlink pathloss using said first received signal strength and a first transmit power associated with said base station;

estimating an uplink pathloss using said second received signal strength and a second transmit power associated with said mobile station; and determining said initial transmit power based on a weighted combination of said downlink pathloss and said uplink pathloss, which initial transmit power is used to begin transmitting signals to said mobile station from said base station.

2. The method of claim 1, wherein said step of measuring said first received signal strength at said mobile station further comprises the step of:

measuring a signal strength of a control channel being transmitted by said base station as said first received signal strength and reporting said first received signal strength to said base station.

3. The method of claim 1, wherein said step of measuring said second received signal strength at said base station further comprises the step of:

measuring a signal strength of an access request by said mobile station on a control channel.

4. The method of claim 1, wherein said step of determining further comprises the steps of:

assigning a first weight to said downlink pathloss;

assigning a second weight to said uplink pathloss;

multiplying said estimated downlink pathloss by said first weight to generate a first weighted value;

multiplying said estimated uplink pathloss by said second weight to generate a second weighted value; and adding said first and said second weighted value together to obtain a combined pathloss estimate.

5. The method of claim 4, wherein said steps of assigning a first and a second weight further include the steps of:

empirically determining errors associated with measuring said first and second received signal strengths and identifying said first and second transmit powers; and assigning said first and second weights in accordance with said errors.

6. The method of claim 1, wherein said weighted combination is determined by taking a largest of said estimated downlink pathloss and said estimated uplink pathloss.

7. The method of claim 1, wherein said step of estimating an uplink pathloss further comprises the step of:

adding a compensation value for different reference points associated with measuring said second received signal strength and identifying said second transmit power.

8. The method of claim 1, wherein said step of measuring said second received signal strength at said base station further comprises the step of:

measuring a signal strength of transmissions by said mobile station on a traffic channel prior to handoff.

9. The method of claim 1, further comprising the step of:

transmitting an indication of said first received signal strength to said base station as part of a mobile assisted channel allocation report.

10. The method of claim 1, further comprising the step of:

transmitting an indication of said first received signal strength to said base station as part of a mobile assisted handoff report.

11. The method of claim 1, wherein said step of determining said initial transmit power further comprises the step of:

adding said weighted combination to a minimum required signal strength for said mobile station.

12. A base station comprising:

a receiver for receiving an uplink signal and measuring a signal strength associated therewith; and a transmitter for initially transmitting downlink signals over an air interface at a predetermined initial power level, said predetermined initial power level being set to a value based upon a weighted combination of a downlink pathloss and an uplink pathloss which is calculated using said measured signal strength and a transmit power used to transmit said uplink signal.

13. The method of claim 1, wherein said downlink pathloss is weighted 50% and said uplink pathloss is weighted 50%.

14. The method of claim 1, wherein said downlink pathloss is weighted 0% and said uplink pathloss is weighted 100%.

15. The base station of claim 12, wherein said downlink pathloss is weighted 50% and said uplink pathloss is weighted 50%.

16. The base station of claim 12, wherein said downlink pathloss is weighted 0% and said uplink pathloss is weighted 100%.

* * * * *